(12) United States Patent
MokhtarzadehBahadorani

(10) Patent No.: US 10,899,529 B2
(45) Date of Patent: Jan. 26, 2021

(54) THERMAL INSULATION BOX WITH TEMPERATURE AND HUMIDITY SENSORS

(71) Applicant: TCP RELIABLE, INC., Edison, NJ (US)

(72) Inventor: Nima MokhtarzadehBahadorani, Montreal (CA)

(73) Assignee: INTEGREON GLOBAL, INC., Edison, NJ (US)

( * ) Notice: Subject to any disclaimer, the term of this patent is extended or adjusted under 35 U.S.C. 154(b) by 188 days.

(21) Appl. No.: 16/212,423

(22) Filed: Dec. 6, 2018

(65) Prior Publication Data

US 2020/0180845 A1 Jun. 11, 2020

(51) Int. Cl.
| | |
|---|---|
| *B65D 81/38* | (2006.01) |
| *A61J 1/00* | (2006.01) |
| *G01K 1/14* | (2006.01) |
| *G01K 1/02* | (2006.01) |
| *G06Q 10/08* | (2012.01) |

(52) U.S. Cl.
CPC ............ *B65D 81/3813* (2013.01); *A61J 1/00* (2013.01); *G01K 1/022* (2013.01); *G01K 1/14* (2013.01); *G06Q 10/0832* (2013.01)

(58) Field of Classification Search
CPC ...... F25D 11/003; F25D 11/006; F25D 3/105; F25D 3/107; F25D 3/102; F25D 29/005; F25D 2400/36; B65D 81/38; B65D 5/5233; B65D 81/3862
See application file for complete search history.

(56) References Cited

U.S. PATENT DOCUMENTS

| | | | | |
|---|---|---|---|---|
| 3,257,820 | A * | 6/1966 | Case | F25D 3/105 62/223 |
| 6,158,227 | A * | 12/2000 | Seeley | G01K 1/16 62/56 |
| 6,409,568 | B1 * | 6/2002 | Søgaard | B65D 5/4204 446/73 |
| 6,968,711 | B2 * | 11/2005 | Smith | C09K 5/047 62/371 |
| 8,887,515 | B2 * | 11/2014 | Patstone | B23P 15/26 62/56 |
| 9,792,748 | B2 * | 10/2017 | Campalans | B65D 81/2076 |
| 9,976,782 | B1 * | 5/2018 | Holzwanger | A61J 1/1468 |

(Continued)

FOREIGN PATENT DOCUMENTS

| | | | | |
|---|---|---|---|---|
| CN | 101415622 A | * | 4/2009 | B65D 81/3862 |
| CN | 104251582 A | * | 12/2014 | F25D 11/006 |

(Continued)

*Primary Examiner* — Nelson J Nieves
(74) *Attorney, Agent, or Firm* — Eric P. Mirabel, JD, LLM

(57) ABSTRACT

The invention relates to a smart thermal insulation box, including thermally insulated layers with mitered edges forming a thermally insulated space, and said space surrounded by corrugated material. The box also has externally viewable and operable temperature and humidity sensors, and optionally, a vibration sensor, where the sensors are preferably fixed inside the box to one side. One of the cardboard panels forming the top of the box which overlays the insulation layer has a window configured to overlay the display panel. An audible alert system may also be included to alert users to temperature or humidity excursions.

7 Claims, 18 Drawing Sheets

(56) References Cited

U.S. PATENT DOCUMENTS

| | | | | |
|---|---|---|---|---|
| 2004/0055313 A1* | 3/2004 | Navedo | ................ | F25D 11/003 62/6 |
| 2006/0230778 A1* | 10/2006 | Williams | ........... | B65D 81/3862 62/371 |
| 2008/0208158 A1* | 8/2008 | Goodman | .......... | B65D 81/3862 604/408 |
| 2009/0078699 A1* | 3/2009 | Mustafa | ............. | B65D 81/3862 220/1.5 |
| 2009/0095798 A1* | 4/2009 | Senftner | ........... | B65D 81/3862 229/103.11 |
| 2009/0314677 A1* | 12/2009 | Teggatz | ................. | A45C 15/06 206/457 |
| 2013/0008182 A1* | 1/2013 | Hrudka | .................. | F25B 21/04 62/3.6 |
| 2013/0082044 A1* | 4/2013 | Doan | .................. | H05B 6/6426 219/387 |
| 2014/0054300 A1* | 2/2014 | Gilpatrick | ............... | B32B 29/08 220/592.16 |
| 2014/0260111 A1* | 9/2014 | Phillips | .................... | F25D 3/08 53/475 |
| 2014/0334517 A1* | 11/2014 | Blundell | ................ | G01J 5/046 374/44 |
| 2014/0338390 A1* | 11/2014 | Pinto | .................... | F25D 11/006 62/441 |
| 2016/0025401 A1* | 1/2016 | Chaparro | ................ | F25D 3/102 62/373 |
| 2016/0068293 A1* | 3/2016 | Cutting | .................... | A61J 1/10 53/432 |
| 2016/0178252 A1* | 6/2016 | Nakamura | ............. | F25B 21/04 62/3.3 |
| 2017/0001785 A1* | 1/2017 | Ripley | .................... | F25D 17/02 |
| 2017/0023290 A1* | 1/2017 | Demuth | .................. | F25D 25/022 |
| 2017/0321947 A1* | 11/2017 | Zvida | .................. | F25D 29/003 |
| 2018/0274843 A1* | 9/2018 | Lombardo | ................ | F25D 3/06 |

FOREIGN PATENT DOCUMENTS

| | | | | | |
|---|---|---|---|---|---|
| CN | 105737471 | A | * | 7/2016 | |
| CN | 105857931 | A | * | 8/2016 | |
| CN | 105865116 | A | * | 8/2016 | ........... F25D 11/006 |
| CN | 106516446 | A | * | 3/2017 | ........... F25D 11/006 |
| CN | 106697597 | A | * | 5/2017 | ........... F25D 11/006 |
| CN | 107178946 | A | * | 9/2017 | ........... F25D 11/006 |
| CN | 108082656 | A | * | 5/2018 | ........... F25D 11/006 |
| WO | WO-2015014417 | A1 | * | 2/2015 | ............... B01L 7/04 |

* cited by examiner

THERMAL INSULATION BOX WITH TEMPERATURE AND HUMIDITY SENSORS

BACKGROUND

Shipment of blood, organs and other biological materials is problematic because of their short effective life, and high value. In general, insulated containers in combination with temperature-control agents, such as refrigerant materials or phase change materials, are widely used as a cost-effective system to maintain the temperature of shipped products at selected temperature ranges. See, e.g., U.S. Pat. Nos. 7,849,708; 7,294,374 and 8,375,730 (all of which are incorporated by reference).

Time in shipment can only be estimated, as there are many sources of delay during shipment, both conventional and unexpected. Also, the temperature during shipment can only be estimated based on expected weather conditions and knowledge of temperatures of the shipment mode and warehouses where the shipment is stored. Unexpected delays and temperature/humidity variations are more frequent as shipping routes become longer, especially where shipping routes become global—which is increasingly the case in the pharmaceutical, vaccine, blood and organ donation field.

If a shipment of such pharmaceutical or biological products is delayed, and/or the temperature varies beyond expectation during shipment for more than a prescribed period, the products may become unusable. Also, for blood or biological products, it is also important to have after-shipment verification of appropriate shipping conditions (esp. temperature, humidity, pH) for regulatory compliance purposes, for both the recipient and the shipper. Thus, what is needed is a cost-effective system to accomplish these goals.

SUMMARY

The invention relates to a smart thermal insulation box with externally viewable values of temperature, humidity and vibration of its contents, and externally operable temperature, humidity and vibration sensors. One embodiment includes twelve contiguous cardboard panels with eight of the cardboard panels being insulated cardboard panels wherein each insulated cardboard panel has an insulation panel with mitered edges adhered to the cardboard panel's major planar surface, and wherein the insulated cardboard panels are configured to be folded along panel intersections to form a box with four sides, a top and a bottom, wherein, each side is an insulated cardboard panel wherein the insulation panel faces the interior of the box, and wherein the top and bottom of the box each consist of: (i) two insulated cardboard panels configured to be folded towards each other to meet along an edge of each of said insulated cardboard panels; and (ii) two cardboard panels configured to be folded towards each other to overlay the two insulated cardboard panels. In another embodiment, the inner box is formed of mating mitered panels and flaps, and it fits into an outer cardboard box. It is noted that instead of corrugated cardboard, one could substitute corrugated plastic sheets, e.g., those manufactured by Coroplast (Quebec, Canada), or wood, metal or another suitable protective material (for protection of the insulation).

Both embodiments further include temperature and humidity sensors, as well as optionally, vibration sensors, positioned inside the box and electrically connected with an externally viewable display panel showing the temperature, humidity, vibration level or other information received from the sensors. Components associated with operating the display panel reside in the insulation layer at the top of the box, and one or more of the cardboard panels forming the top of the box which overlays the insulation layer has a window configured to overlay the display panel. Optionally, added mirror or slave displays, or displays independently receiving and processing signals from the sensors, are positioned on one or more panels, and are visible on sides of the box. In both embodiments, the temperature and humidity and other sensors are preferably all on a single pad which is fixed inside the box. Other components and configurations are set forth in the drawings and the Detailed Description below.

It should be understood that the drawings and their associated descriptions below are intended and provided to illustrate one or more embodiments of the present invention, and not to limit the scope of the invention. Also, it should be noted that the drawings are not be necessarily drawn to scale.

DETAILED DESCRIPTION

Figure 1:
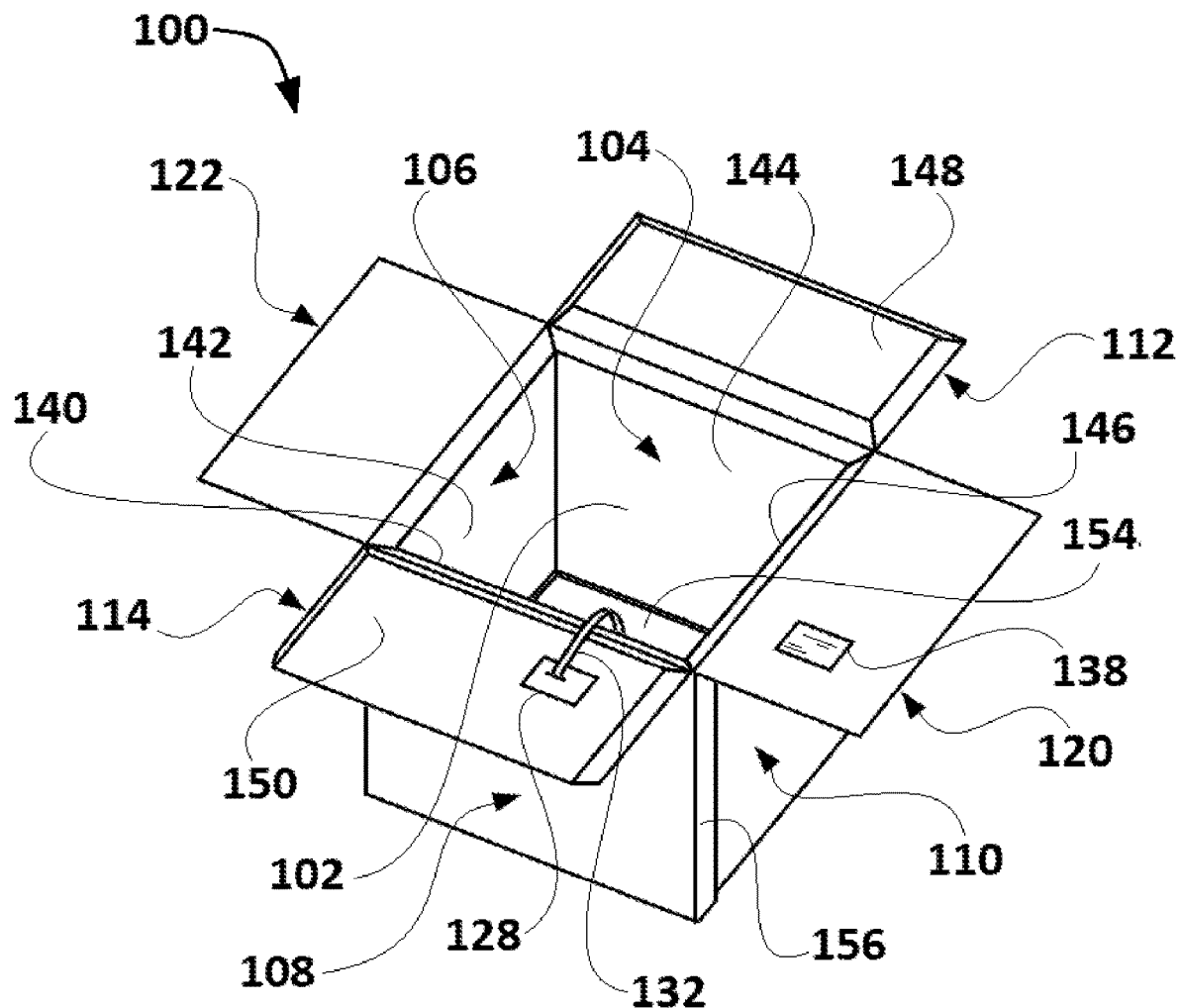
FIG. 1 illustrates a perspective view of a smart thermal insulation box in accordance with a first embodiment of the present invention

Reference will now be made in detail to a first embodiment of a smart thermal insulation box of the invention with reference to the accompanying FIGS. 1 to 4F. FIG. 1 illustrates smart thermal insulation box 100 with its top flaps 112, 114, 120, and 122 opened. As illustrated, the smart thermal insulation box 100 includes an internal space 102 for cargo. Internal space 102 is enclosed within thermally insulated surfaces 140, 142, 144, 146 of walls 104, 106, 108, 110 respectively, and ultimately covered by thermally insulated surfaces 148, 150, 152 and 154 of flaps 112, 114, 116, and 118, respectively. Since walls 108 and 110 stand opposite to walls 104 and 106 respectively, they remain partially hidden in the view illustrated in FIG. 1. Similarly, since flap surfaces 116 and 118 form the bottom of the internal space 102, and flaps 124 and 126 fold under them, flap 118 remains partially hidden (only its thermally insulated surface 154 remains partially visible), and flaps 116, 124 and 126 remain completely hidden in the view illustrated in FIG. 1. Flaps 112, 122, 114, and 120 fold along upper edges of walls 104, 106, 108 and 110 respectively, to form the top of box 100, and, flaps 116, 118, 124, and 126 respectively fold along lower edges of these wall surfaces, forming the bottom of box 100. Still further, in the assembled state of smart thermal insulation box 100, flaps 120 and 122 fold over flaps 112 and 114 respectively, and flaps 124 and 126 fold over flaps 116 and 118 respectively. A flap strip 156 attached to wall 108 (with adhesive on the inner side) adheres to the outer side along near the edge of wall 110 to maintain box 100 in assembly.

Figure 2:
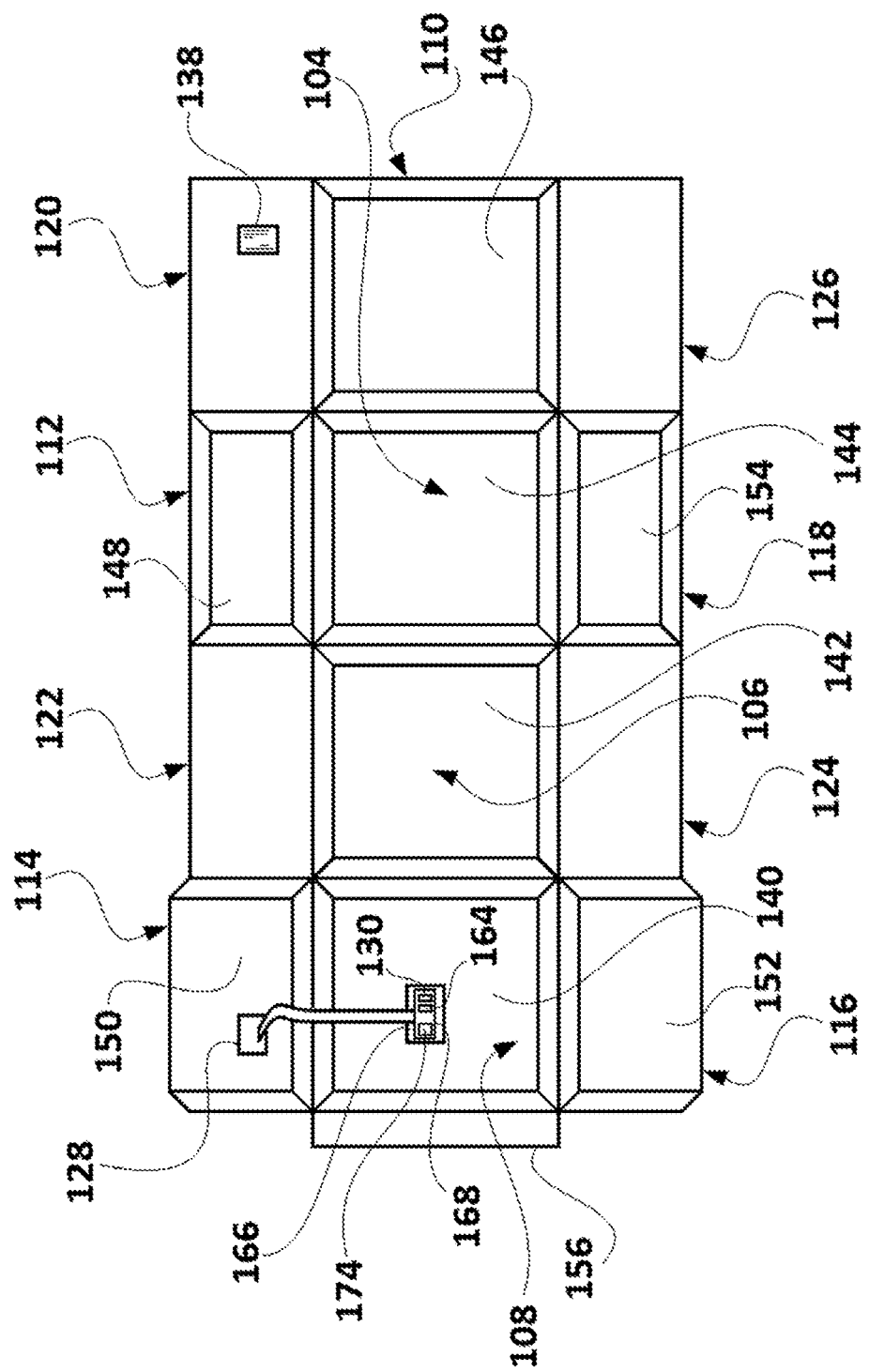
FIG. 2 illustrates a view of an unfolded smart thermal insulation box in accordance with a first embodiment of the present invention.
Figure 3:
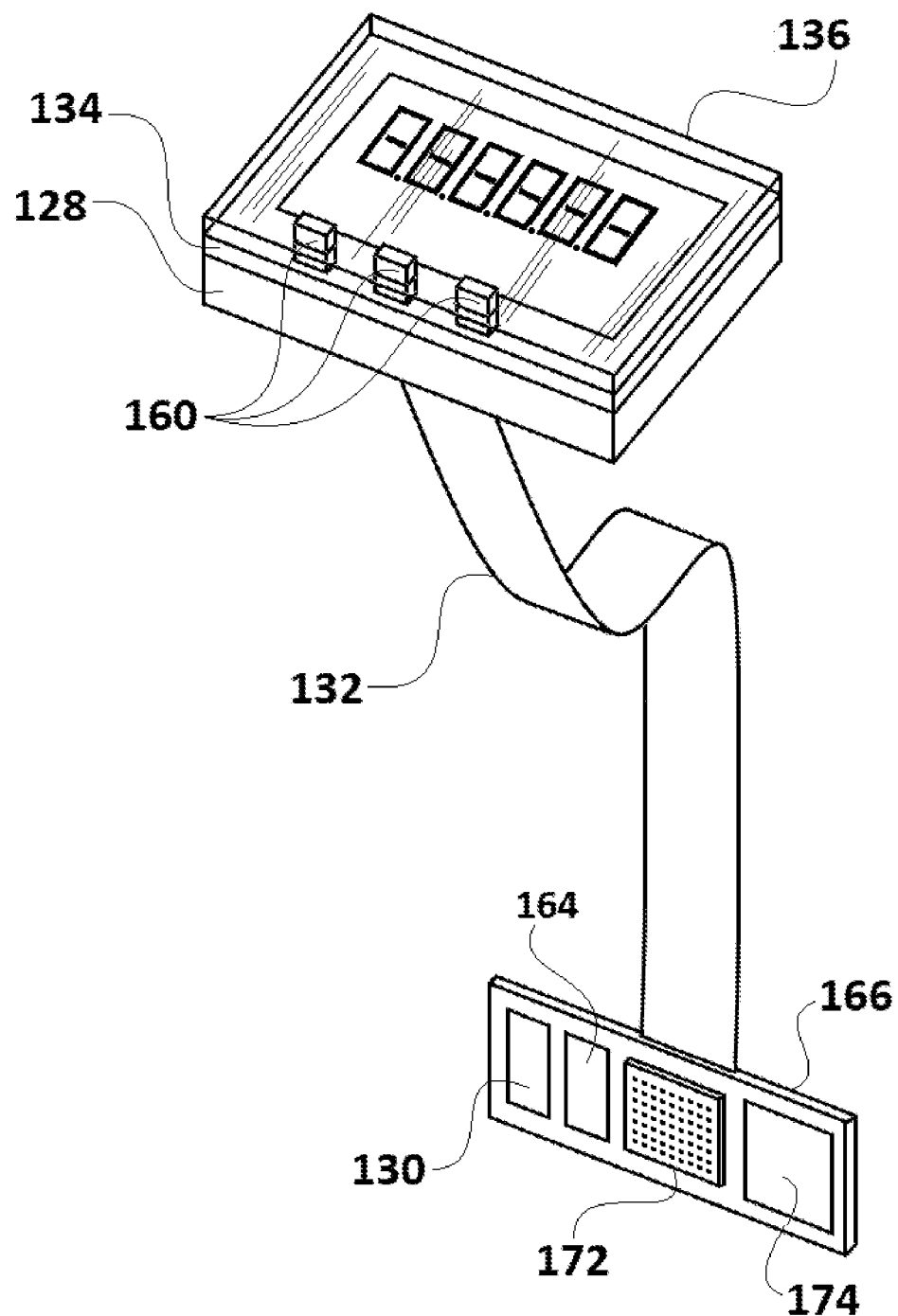
FIG. 3 illustrates a perspective view of a processor board used in the invention along with its cover, sensors and a Velcro pad for attachment inside the box.

FIG. 1 shows an embedded processor board 128 included in flap 114. FIG. 3 shows the details of processor board 128, which is connected to a sensor pad 166 with a multi-conductor ribbon cable 132. The sensor pad 166 includes a temperature sensor 130, a humidity sensor 164, a vibration sensor 174; and a Velcro pad 172 on one side of sensor pad 166 wherein Velcro pad 172 constitutes one portion of a hook and loop fastener. The sensor pad 166 is fixed to a mating Velcro pad 170, with the mating portion of a hook and loop fastener, where Velcro pad 170 is installed in a recess 168 of insulated walled surface 140 of wall 108 (see also FIGS. 3, 4D and 4E for features not shown in FIG. 2).

Processor board 128 includes a cover of a seven segment type LCD or LED display screen 134 for displaying the units of temperature and humidity detected by sensors 130 and 164, and a beeper (not illustrated) for providing audible alarms. Operation of both, the display screen 134 and the beeper are connected to processor board 128. A seven-segment display for screen 134 is shown for the purpose of illustration; however, based on requirements, the count and layout of the segment units of the display screen 134 may vary. Processor board 128 further includes a microprocessor, a memory and associated circuitry on a circuit board, for:

i) measuring the outputs received from sensors 130, 164, and 174, and displaying of temperature, humidity and vibration on the display screen 134, and ii) presenting records and averages and other analysis of temperature and humidity values previously recorded.

For user control of processor board 128 and display screen 134 (to request temperature-humidity-vibration records, or averages over time periods) and to power it on or off as and when required, processor board 128 includes user input keys 160. Processor board 128 optionally, further includes transceiver and GPS circuitry for wirelessly communicating data and location information to a remote server. Technology and circuitry for performing the functions of processor board 128 are well known, as shown e.g., in U.S. Pat. Nos. 9,835,501; 8,935,934 (incorporated by reference). Still further, for powering processor board 128, a DC battery (not shown) preferably, a +9V DC battery, is also included.

For protection against ingression of dust, water or other fluid, a transparent cover 136 (preferably, clear plastic) is provided above display screen 134. To facilitate an unrestricted view of display screen 134 in the assembled state of box 100, wherein the flap 120 is folded over both flap 114 and the display screen 134 of processor board 128, flap 120 includes a "see-through" window 138, which overlays display screen 134 and cover 136 when box 100 is assembled and closed. Still further, both the transparent cover 136 and window 138 include coinciding apertures for enabling keys 160 to be operated from the outside of box 100 when it's closed. Keys 160 may protrude above the plane of window 138.

When powered-on, processor board 128 receives sensed temperature and humidity inputs from sensors 130 and 164 respectively, processes and measures them, and displays the measured temperature and humidity on display screen 134.

Box 100 is preferably made of a single piece of foldable cardboard having a set of panels of thermal insulator material (preferably, expanded polystyrene, "EPS") adhered to some portions, preferably with glue. A view of box 100 in a fully unfolded state is illustrated in FIG. 2. Walls 104, 106, 108, 110, as well as flaps 112, 114, 116 and 118 are all bi-layered, having a layer of thermal insulator material applied over a cardboard layer—which forms the outer surface of assembled box 100. Flaps 112, 114, 122, and 120 are each attached only to their respective walls 108, 106, 104, and 110, along a common peripheral edge or fold line; which is also true for flaps 116, 118, 124, and 126, i.e., they are attached only to their respective walls 108, 106, 104, and 110, along a common peripheral edge or the fold line. The other three edges of flaps 112, 114, 116, 118, 120, 122, 124, and 126 are not attached to any other wall or flap.

When box 100 is assembled and closed, the internal space 102 is surrounded by thermal insulator material of walls 104, 106, 108, 110, and flaps 112, 114, 116, and 118. To facilitate folding of the unfolded single piece foldable cardboard (FIG. 2) and to keep the internal space 102 well insulated from the surroundings, the edges of each panel of thermal insulator material (140, 142, 144, 146, 148, 150, 152, and 154) on walls 104, 106, 108, and 110, and flaps 112, 114, 116, and 118, are mitered, and mate with all adjacent mitered edges to seal (or nearly seal) the internal space 102 from surroundings. Preferably the thickness of all panels of thermal insulator material are substantially the same. However, the combined thickness of the cardboard layer and insulator material 150 of flap 114 must be sufficient to hold all components of processor board 128, display screen 134, and transparent cover 136 and accordingly, it may have a greater thickness.

Figure 4A:
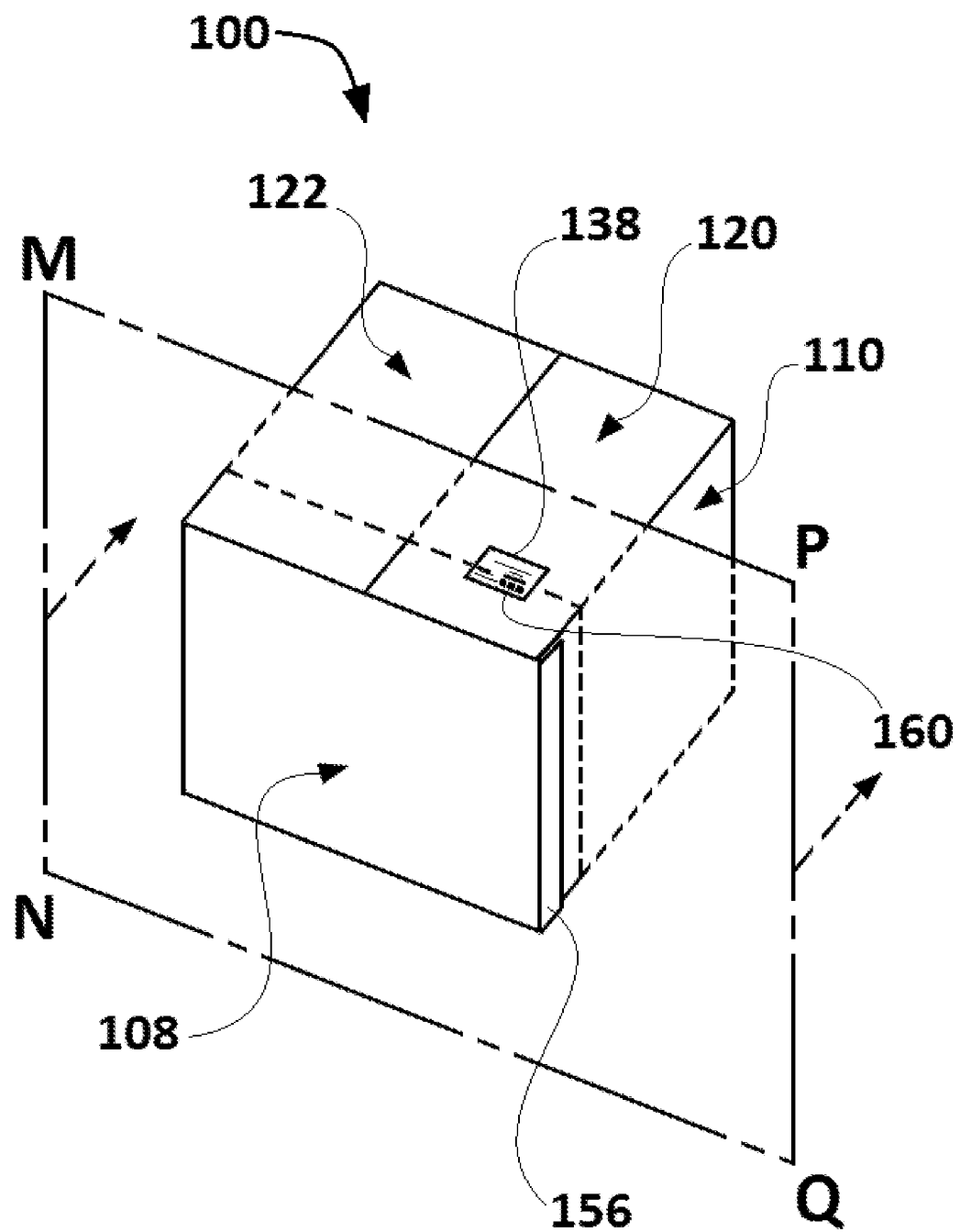
FIGS. 4A, 4B and 4C illustrate a perspective view of a fully packed smart thermal insulation box in accordance with the first embodiment of the invention, with each figure showing one of the three perpendicular planes MNPQ, RSTU and ABCD.
Figure 4B:
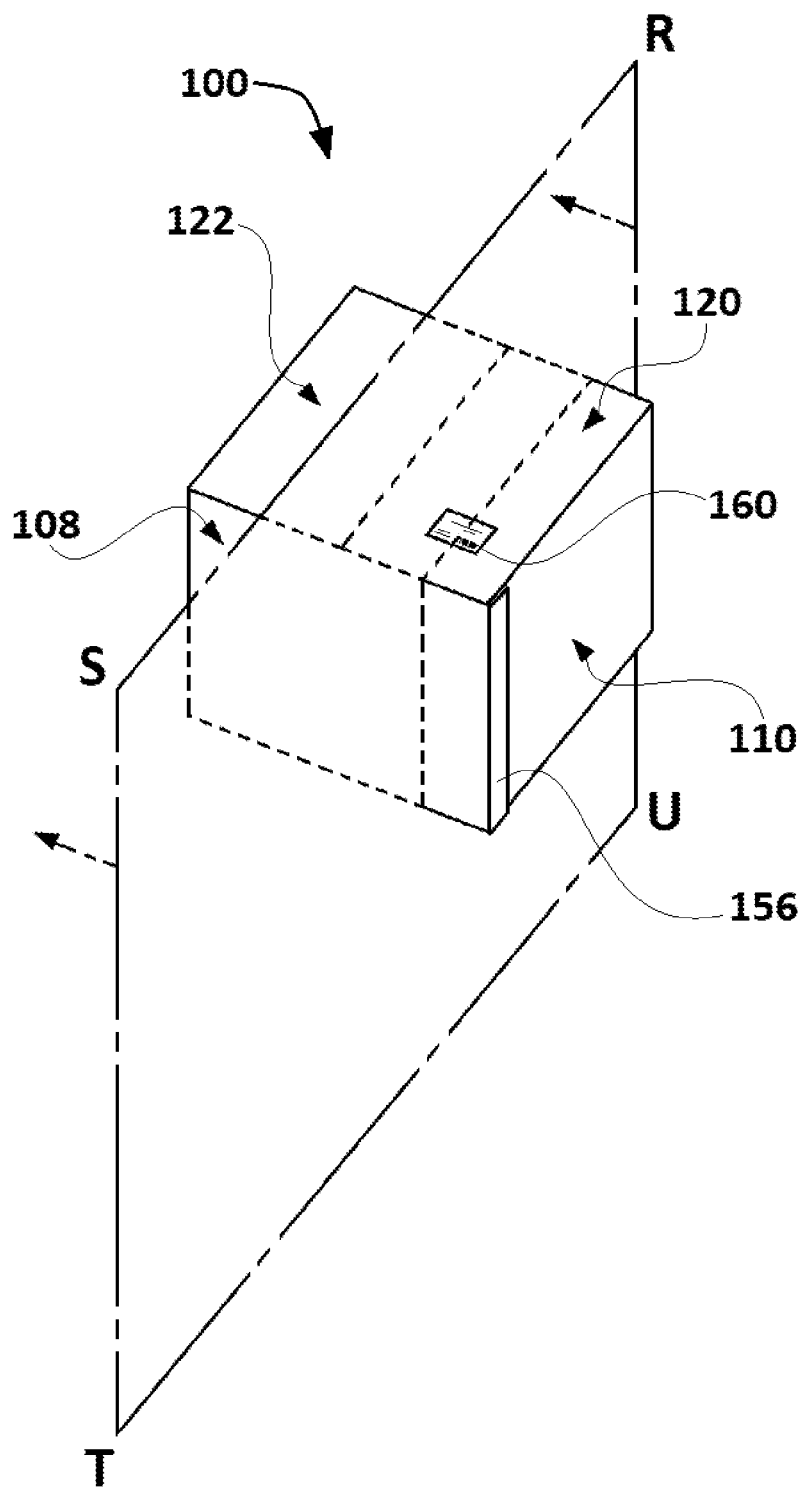
Figure 4C:
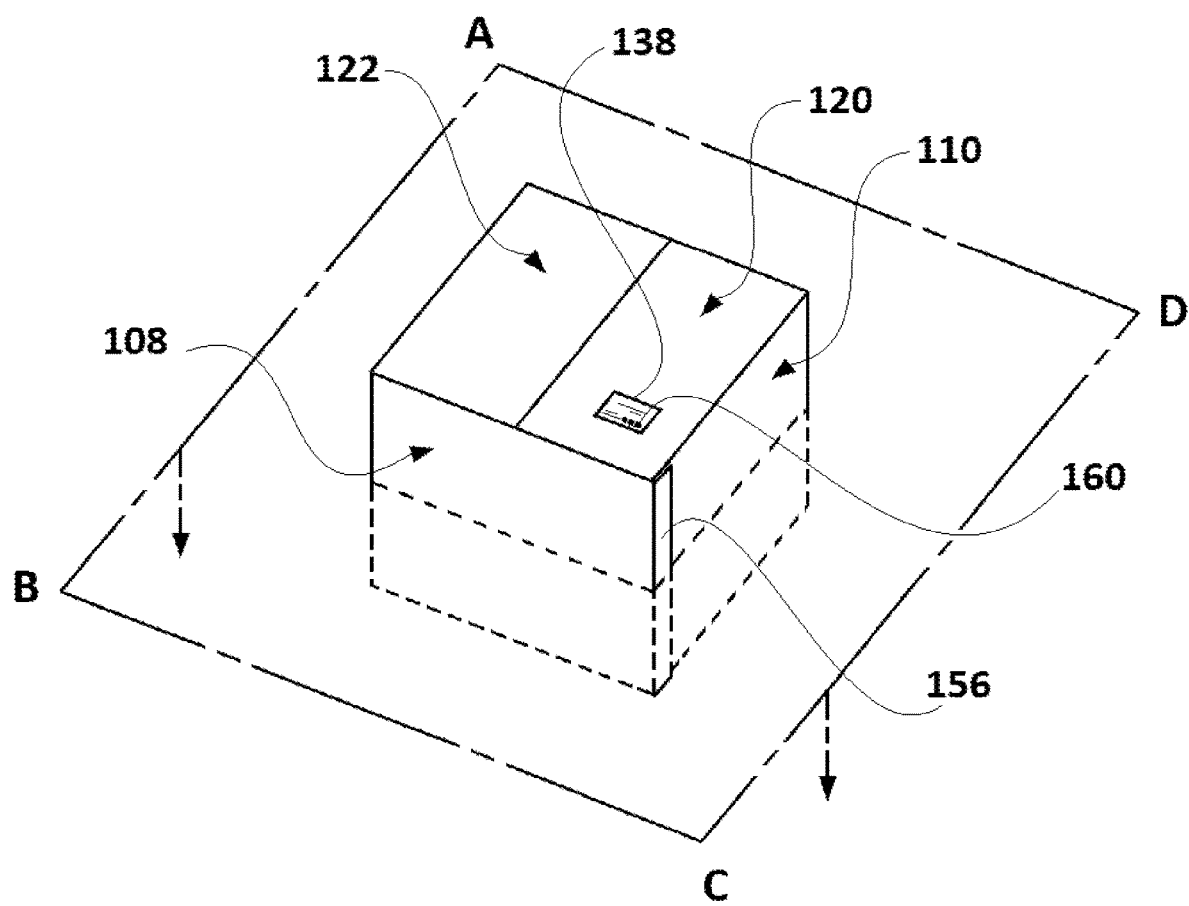
Figure 4D:
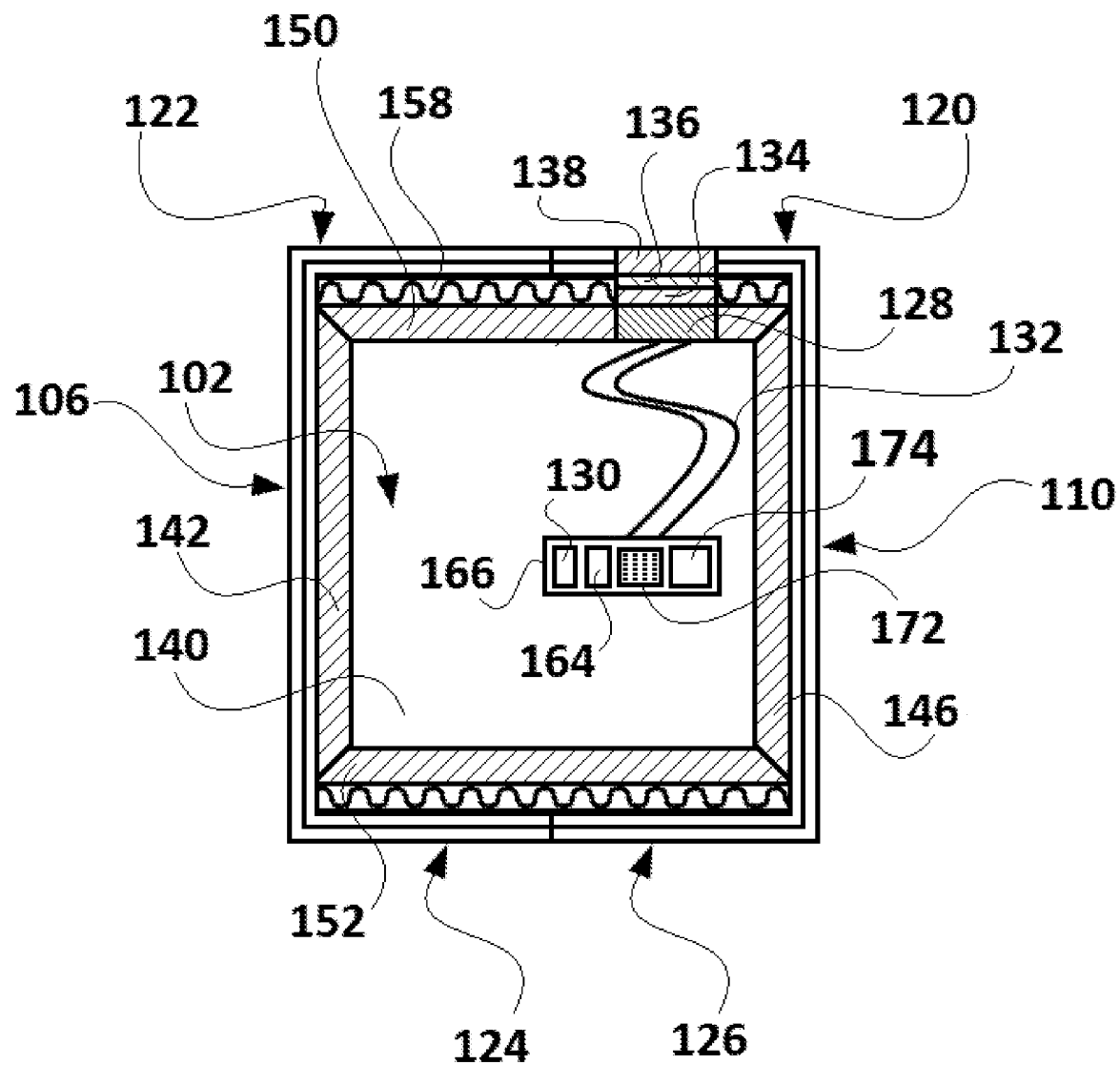
FIG. 4D provides a cross-sectional view of the fully packed smart thermal insulation box taken along plane MNPQ.
Figure 4E:
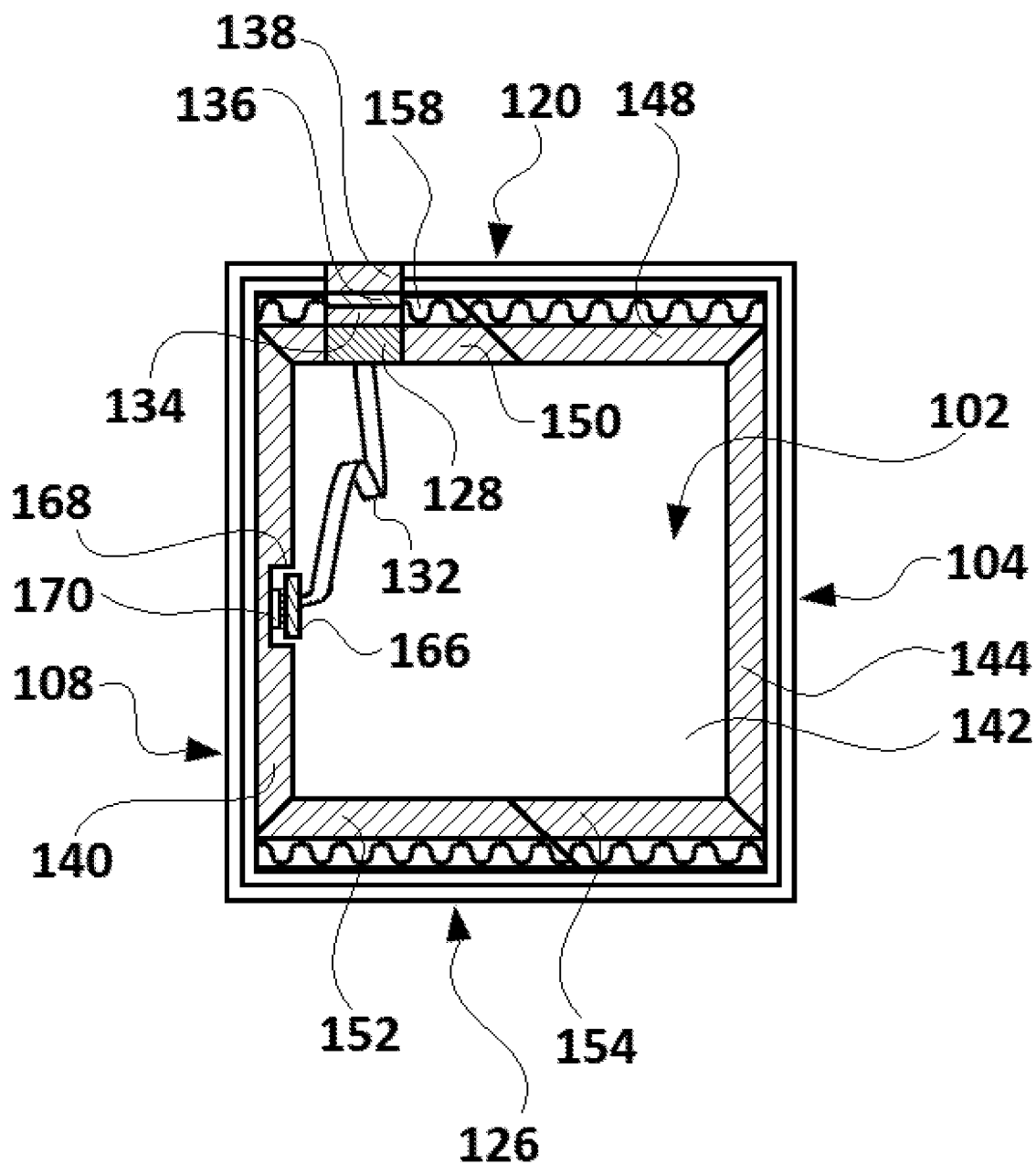
FIG. 4E provides a cross-sectional view of the fully packed smart thermal insulation box taken along plane RSTU.
Figure 4F:
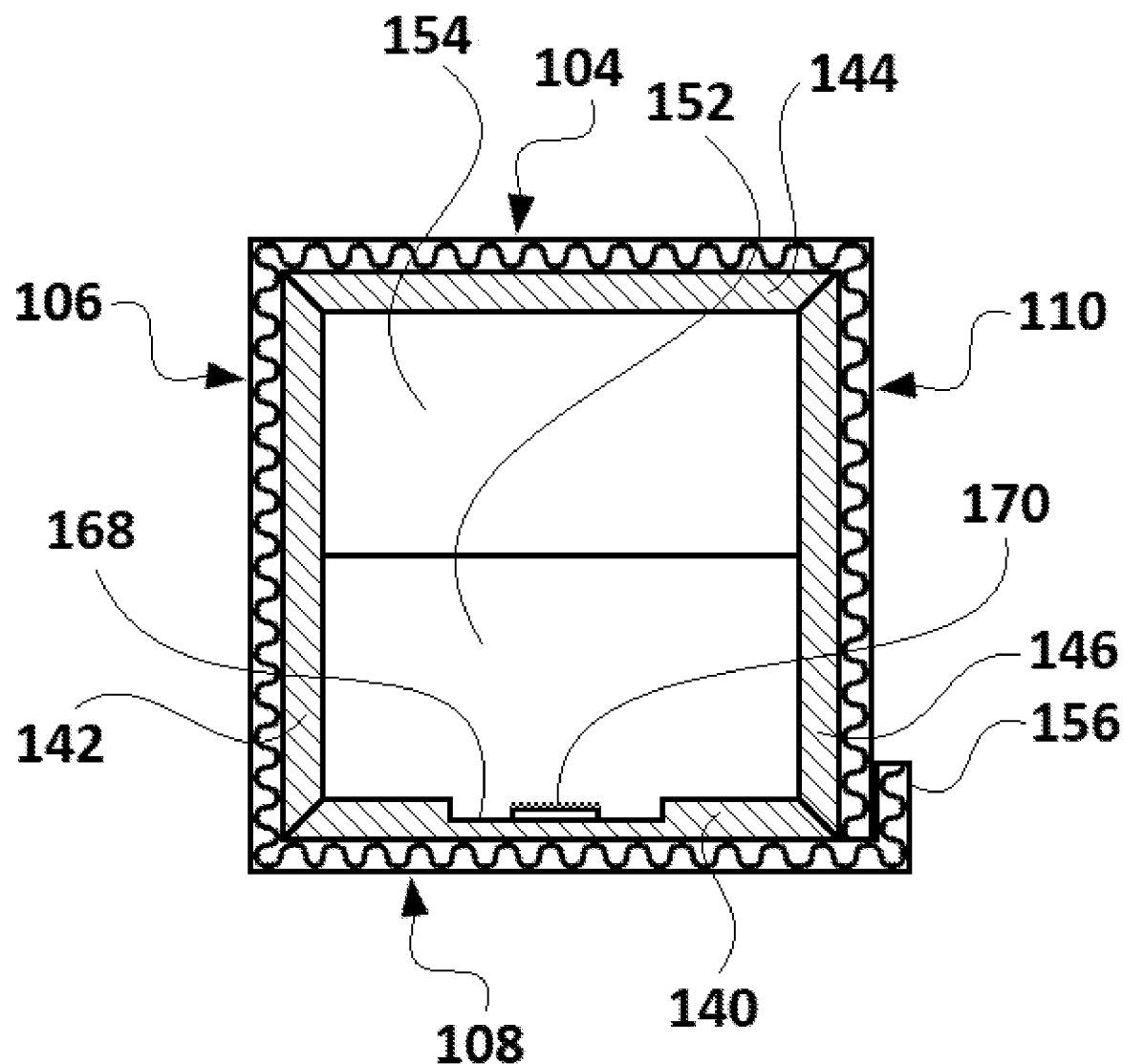
FIG. 4F provides a cross-sectional view of the fully packed smart thermal insulation box taken along plane ABCD.

FIGS. 4D, 4E and 4F illustrate cross-sections of fully assembled smart thermal insulation box 100 along three perpendicular planes MNPQ, RSTU and ABCD, respectively. As illustrated in FIG. 4D, the combination of processor board 128, display screen 134 and transparent cover 136, is embedded in panel 150 of flap 114. A minor portion of the combination lies in the cardboard layer of flap 114. Sensor pad 166 lies within internal space 102 and is connected to processor board 128 through ribbon cable 132. Though the sensor pad 166 is fixed to Velcro pad 170 installed in a recess 168 of insulated walled surface 140, the ribbon cable 132 is preferably long enough to facilitate placement of sensor pad 166 at any other desired location within the internal space 102. For the purpose of providing a better understanding of the described embodiments. the illustrated thickness of the corrugated cardboard layers in FIGS. 4D, 4E and 4F is enhanced and not to scale. The corrugations illustrated for cardboard in the flaps and walls of all portions of box 100 provide added strength.

In a preferred mode of operation, before placing a temperature (and/or humidity) sensitive cargo within smart thermal insulation box 100, the sensor pad 166 is placed within recess 168 by attaching Velcro pad 172 to the Velcro pad 170. In FIG. 2, while Velcro pad 170 remains hidden behind sensor pad 166, it is illustrated in cross-section of FIG. 4F. After loading a temperature (and/or humidity) sensitive cargo into box 100, any empty space within the internal space 102 is preferably filled with packing material, more preferably, insulating packing materials. Thereafter, box 100 is sealed by folding all flaps in, adhering the adhesive side of flap strip 156 to wall 110, and preferably securing box 100 in position by wrapping it with adhesive tape. Once sealed, the processor board 128 is powered on, and then operated automatically or by user keys 160 to monitor temperature of the cargo (and/or the humidity within the internal space 102) at desired time intervals. In case the that temperature of the cargo or humidity breaches tolerable limits, the beeper produces an audible alarm, and the box 100 may be opened and the cargo (or the internal space 102) may be treated suitably to bring monitored temperature (and/or humidity) to acceptable levels. The beeper may be muted manually as and when required, or may be programmed suitably for adjusting magnitude and timings of audible alarm through keys 160.

Figure 5:
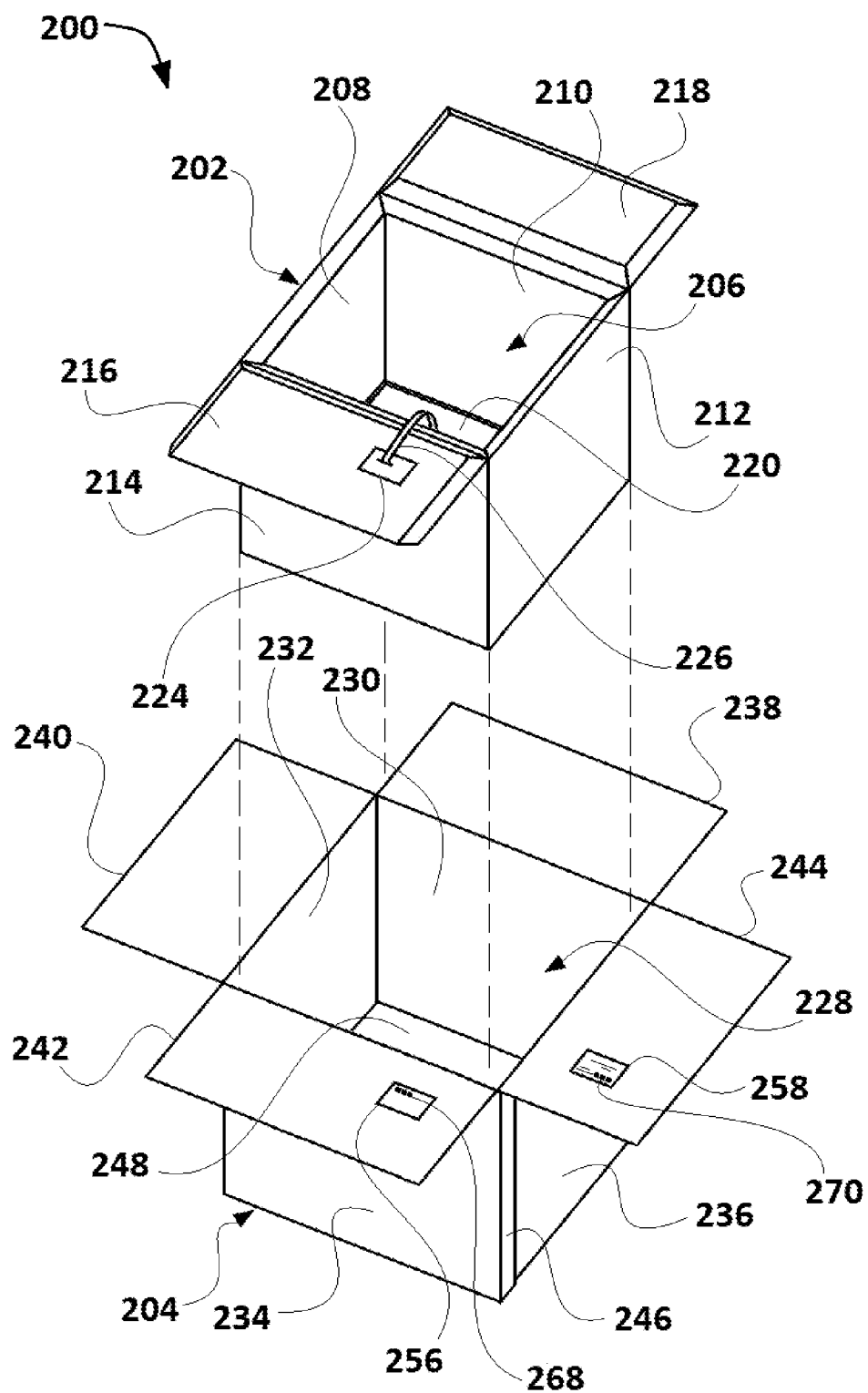
FIG. 5 illustrates an exploded view of a smart thermal insulation box in accordance with a second embodiment of the present invention.
Figure 6A:
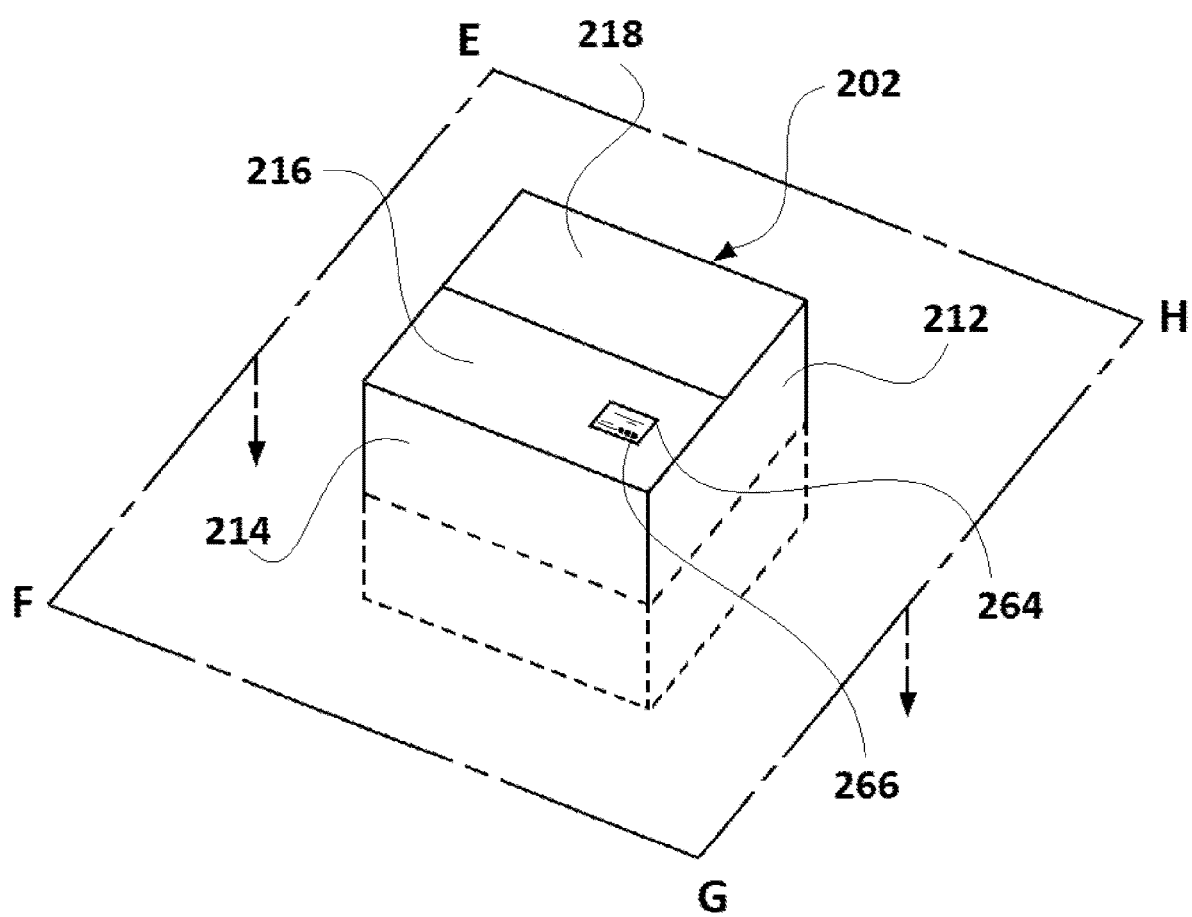
FIG. 6A illustrates a perspective view of a smart internal thermal insulation box of FIG. 5 with the lid closed, and showing plane EFGH.
Figure 6B:
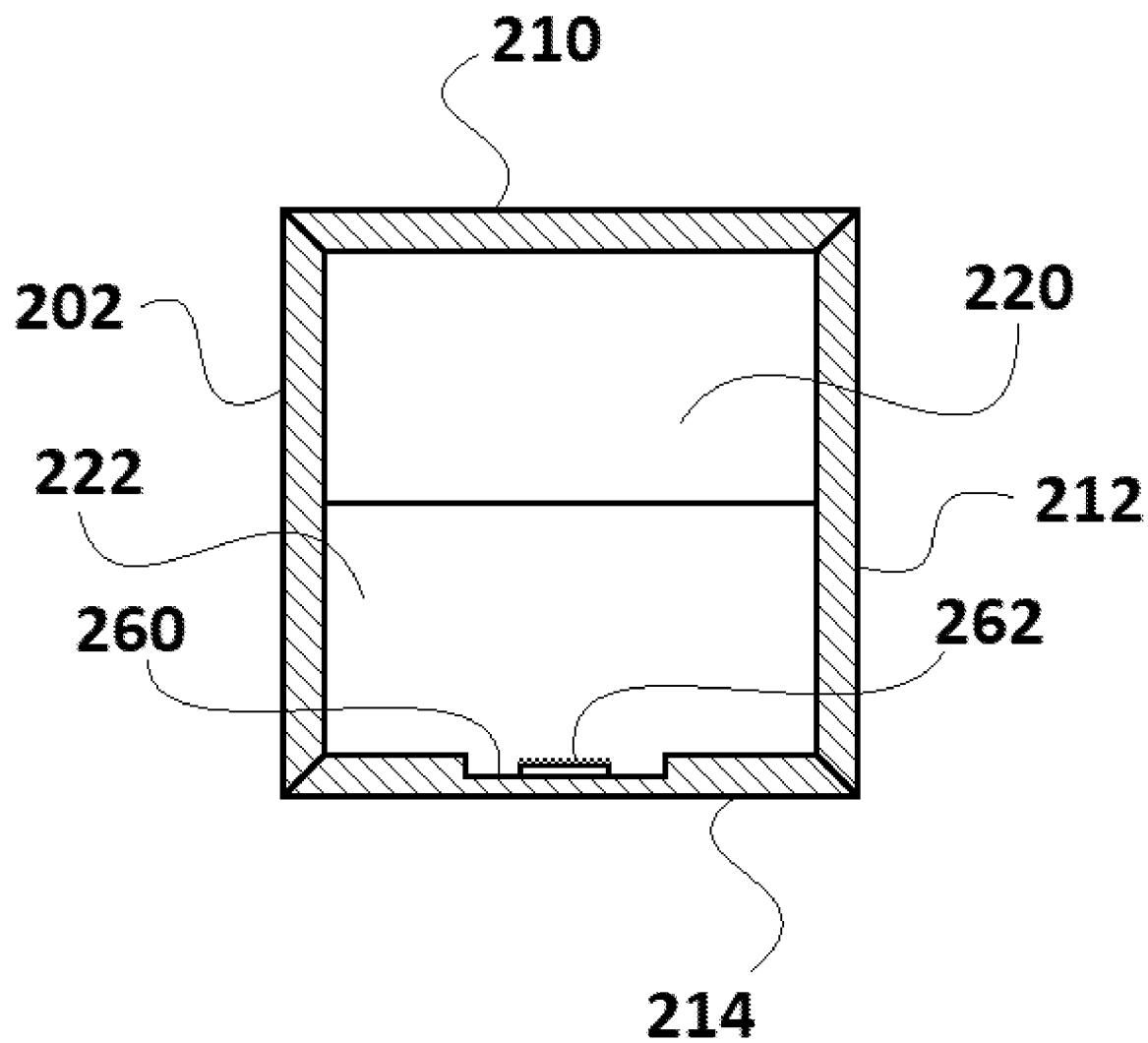
FIG. 6B illustrates a cross-sectional view of smart internal thermal insulation box of FIG. 5 taken along plane EFGH.

A second embodiment of the present invention is shown in FIGS. 5, 6A and 6B. In contrast to the first embodiment where the smart thermal insulation box 100 is made of a single piece of foldable cardboard having a set of panels of thermal insulator material adhered to some portions, the smart thermal insulation box 200 of the second embodiment includes a separate inner insulator box 202 and outer cardboard box 204. Insulator box 202 is made of four identical panels of thermal insulation material (preferably EPS) joined together at their mitered edges for the sides and bottom, and two flaps which join along a mitered edge form each of the top and bottom of box 202. In a fully assembled and packed state of the box 202, its internal space 206 is surrounded by walls 208, 210, 212, 214, and flaps 216, 218, 220 and 222. While flaps 216 and 218 form the upper cover of the internal space 206 (and insulator box 202), flaps 220 and 222 form its lower covers. Flaps 220 and 222 are structurally and operationally similar to flaps 216 and 218. In the illustration of FIG. 5, flaps 220 and 222 are closed to form lower cover of insulator box 202. In FIG. 2, flap 220 remains partially visible and flap 222 remains completely hidden.

A processor board 224 is embedded in flap 216 and is connected to a sensor pad (not illustrated) installed in the internal surface of wall 214 through a ribbon cable 226. The sensor pad installed in the internal surface of wall 214 has structure and function similar to the sensor pad 166 described in the first embodiment above. Still further, similar to first embodiment, processor board 224 also includes a beeper, a covering display screen and a transparent cover 264 (transparent cover 264 is illustrated in FIG. 6B). The entire stack of the processor board 224 (including beeper, a powering DC battery), the display screen and the transparent cover 264 are fully embedded in flap 216. Still further, a fixation mechanism for holding the sensor pad in a recess 260 in the internal surface of wall 214 through a Velcro pad 262 (illustrated in FIG. 6B), is similar to the analogous description provided for holding sensor pad 166 in first embodiment above.

In a fully packed state of smart thermal insulation box 200, insulator box 202 fits within the internal space 228 of the cardboard box 204. In a fully assembled and packed state of the cardboard box 204, its internal space 228 is surrounded by walls 230, 232, 234, 236, upper flaps 238, 240, 242, 244, and lower flaps 248, 250, 252 and 254. While lower flap 248 remains partially hidden, other lower flaps (i.e. flaps 250, 252 and 254) remain completely hidden in FIG. 5. Still further, a flap strip 246 attached to wall 234 adheres to the outer side of wall 236 near the edge to maintain box 204 in assembly.

Upper flaps 242 and 244 of cardboard box 204 include apertured transparent slabs 256 and 258 respectively. Both the transparent slabs 256 and 258 include coinciding apertures 268 and 270 respectively for enabling keys 266 of the processor board 224 to protrude or to lie above the planes of transparent slab 256 and 258, when the smart thermal insulation box 200 is in a fully assembled and packed state. The height of each of the keys 266 of the processor board 224 may be greater than the combined thickness of all upper flaps.

A cross-section of insulator box 202 taken along a horizontal plane EFGH (as illustrated in FIG. 6A) is illustrated in FIG. 6B. Similar to the insulator panels of box 100, the panels of insulator box 202 are mitered at their edges (as shown in FIG. 5). It is also within the scope of the invention to include phase change materials and/or a mitered phase-change material containment structure within insulator box 202, as described e.g. in U.S. Pat. No. 9,751,682 (incorporated by reference). Moreover, one could include additional materials within insulator box 202 to enhance insulation, including additional EPS or other foam insulation material, cardboard or paper, loose fill material or other materials.

Figure 7:
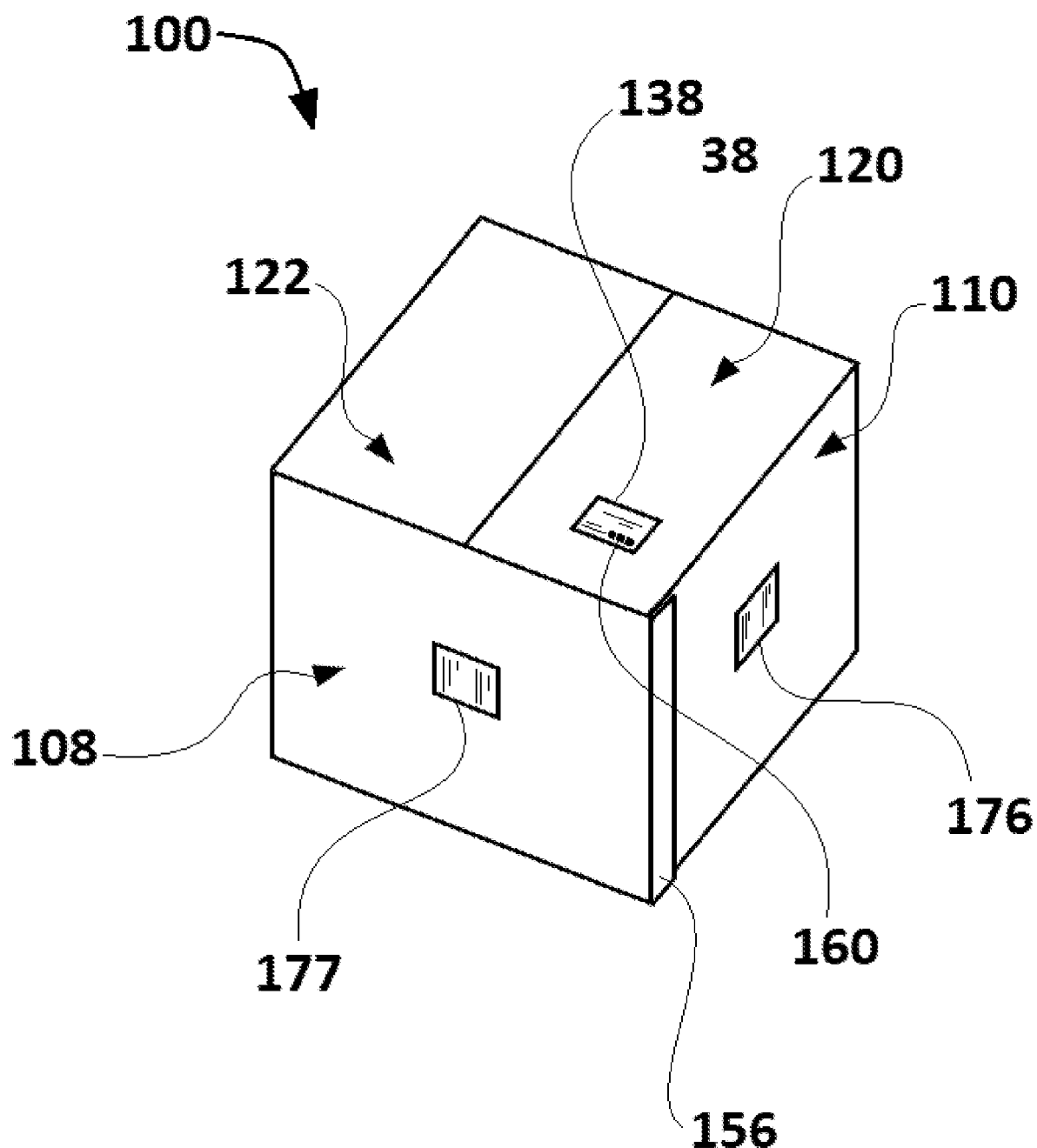
FIG. 7 illustrate a perspective view of another embodiment of the box of FIGS. 1 to 4F, with additional display screens shown.
Figure 8A:
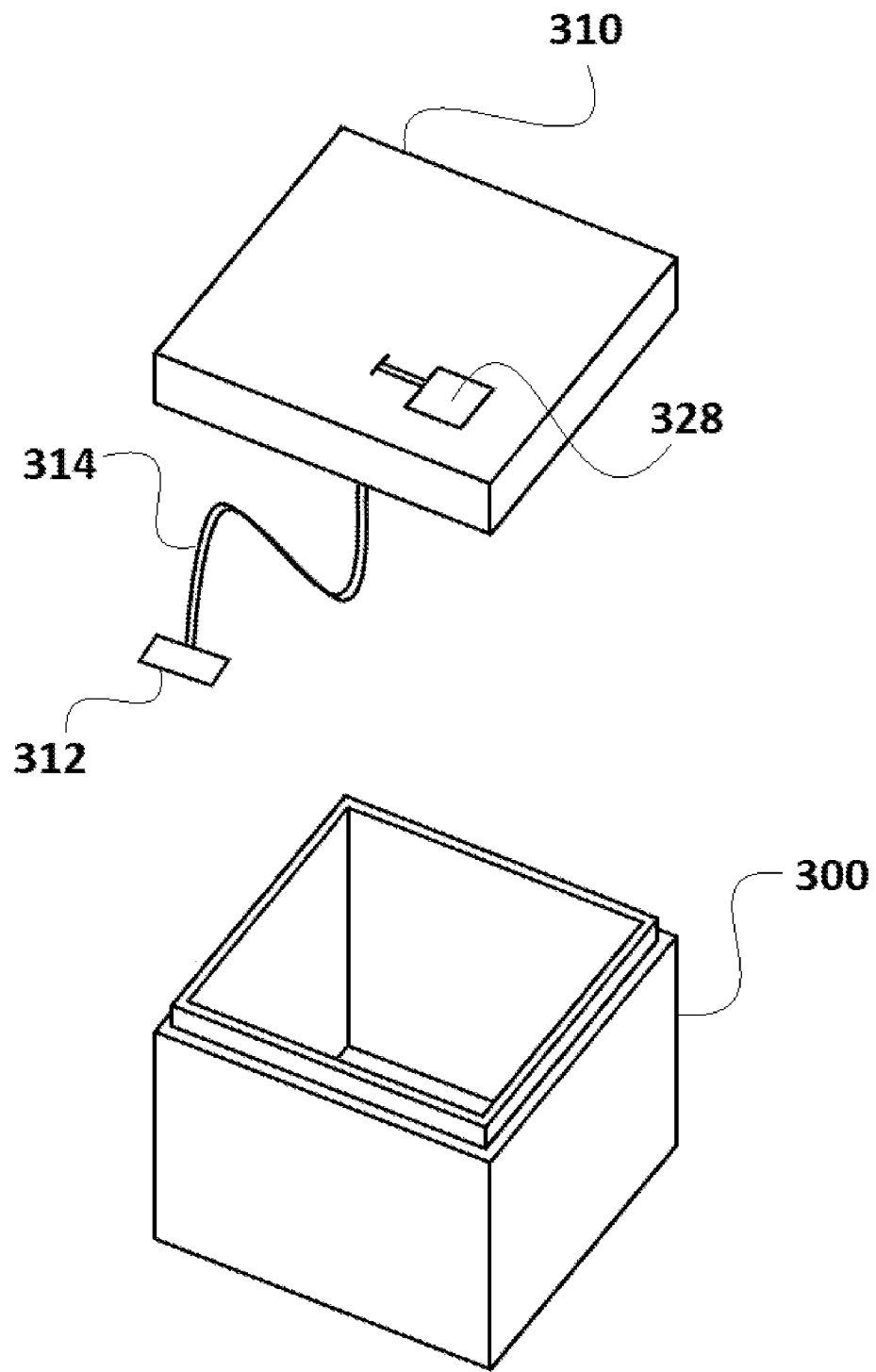
FIG. 8A is an exploded view of an additional embodiment of the inner insulating portion of smart thermal insulation box.
Figure 8B:
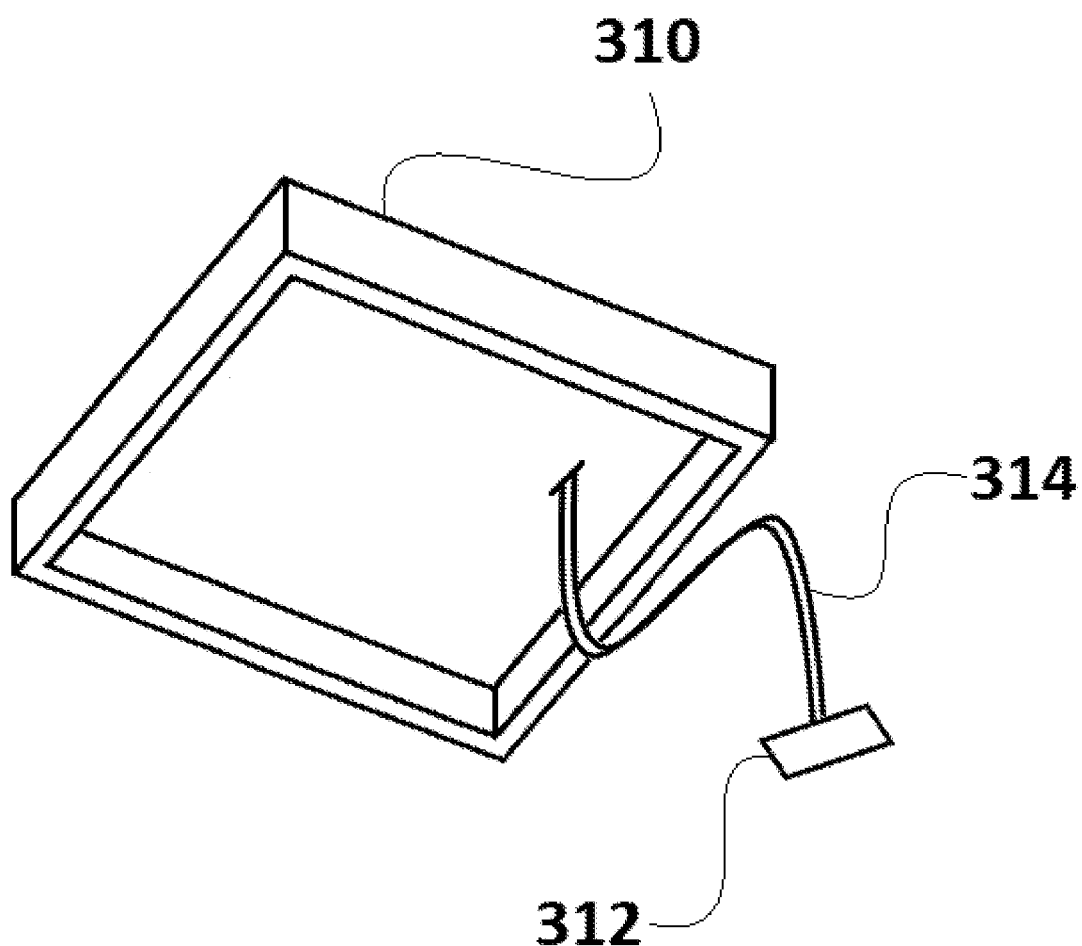
FIG. 8B shows the underside of the lid of the inner insulating portion of smart thermal insulation box shown in FIG. 8A.

FIG. 7 shows another embodiment of box 100 of FIGS. 1 to 4F, with additional display screens 176, 178, each on one side of box 100. Additional display screens may also be on the sides hidden from view in FIG. 7. These display screens 176, 178 and others not shown would be visible from below if box 100 is stored on a high shelf (as in a warehouse). Display screens 176, 178 and others not shown could be slave screens, fed by the signal from display screen 134. Or, they could independently receive input, perhaps through additional ribbon cables like cable 132, from sensors 130, 164, and 174.

FIGS. 8A to 9C show another embodiment of a smart thermal insulation box, where the insulating components (made of insulating material, preferably "EPS") are in two pieces: a body 300 with a lid 310. Processor board 328 receives input from monitor temperature, humidity and vibration sensors (incorporated in sensor pad 312), by connection through ribbon cable 314. Processor board 328 provides visible display of temperature, humidity and vibration, similar to processor board 128.

Figure 9A:
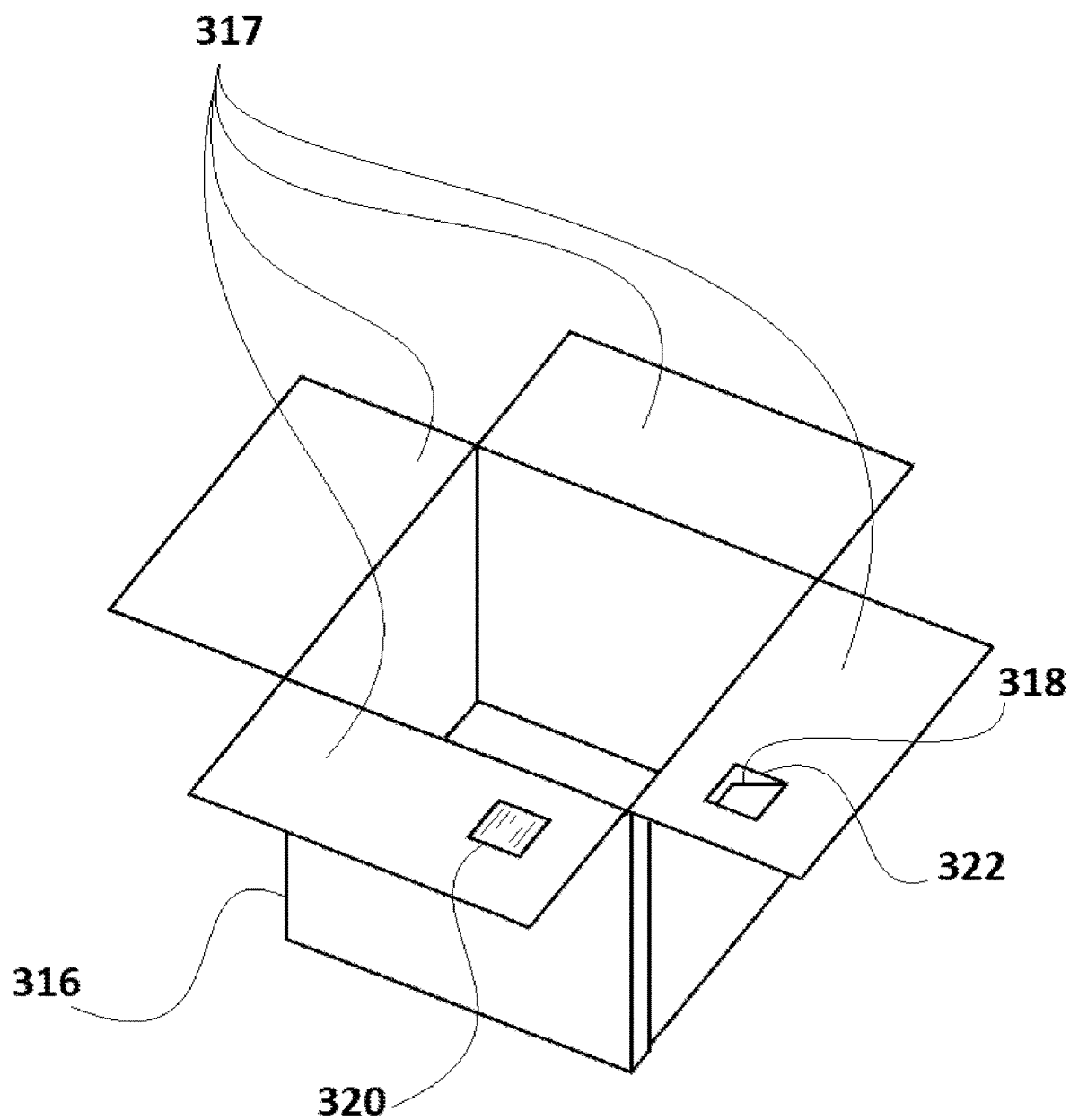
FIG. 9A is a perspective view of the outer box for the additional embodiment shown in FIGS. 8A and 8B.
Figure 9B:
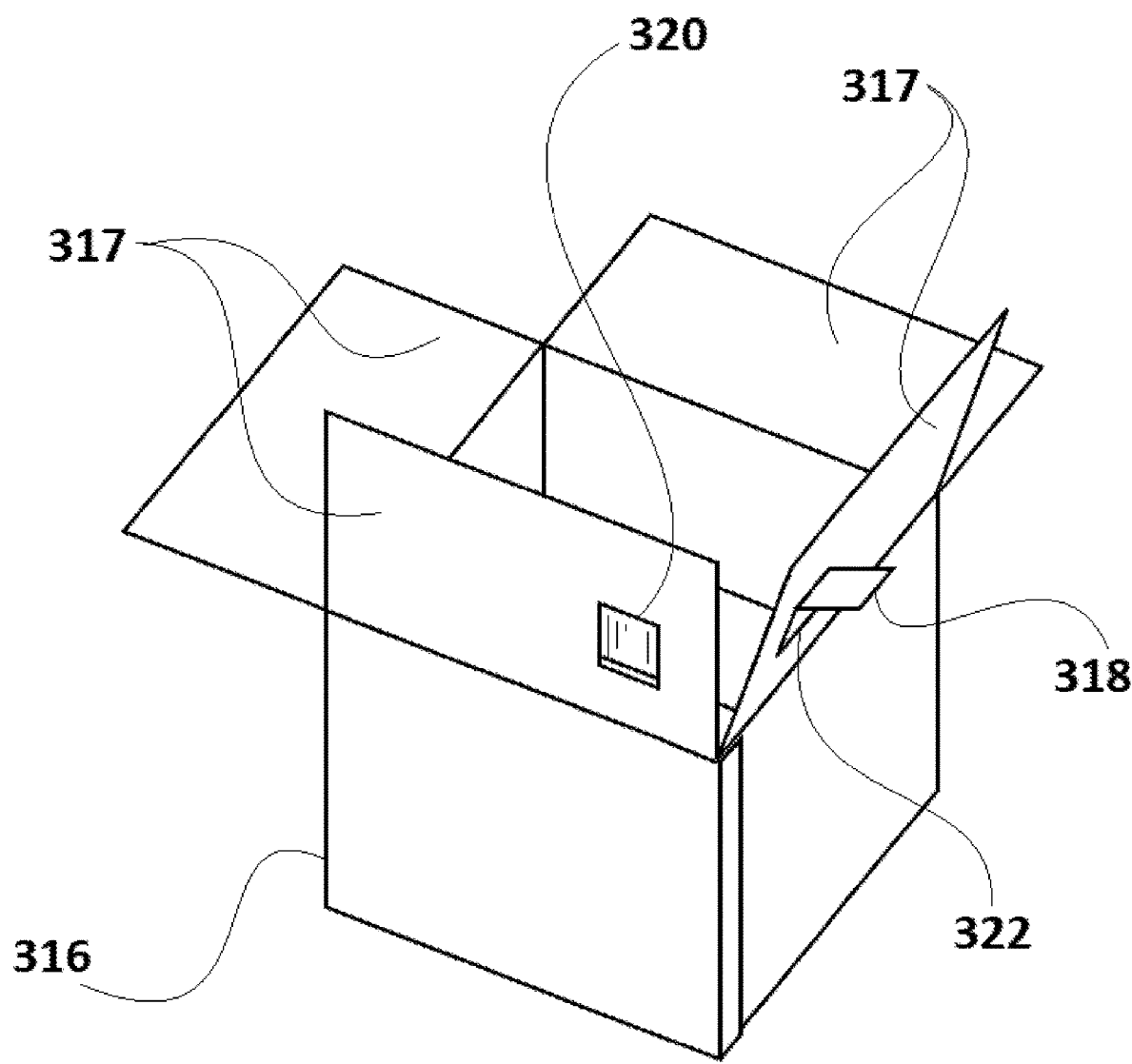
FIG. 9B is a perspective view of the outer box shown in FIG. 9A, with the upper flaps partially closed.
Figure 9C:
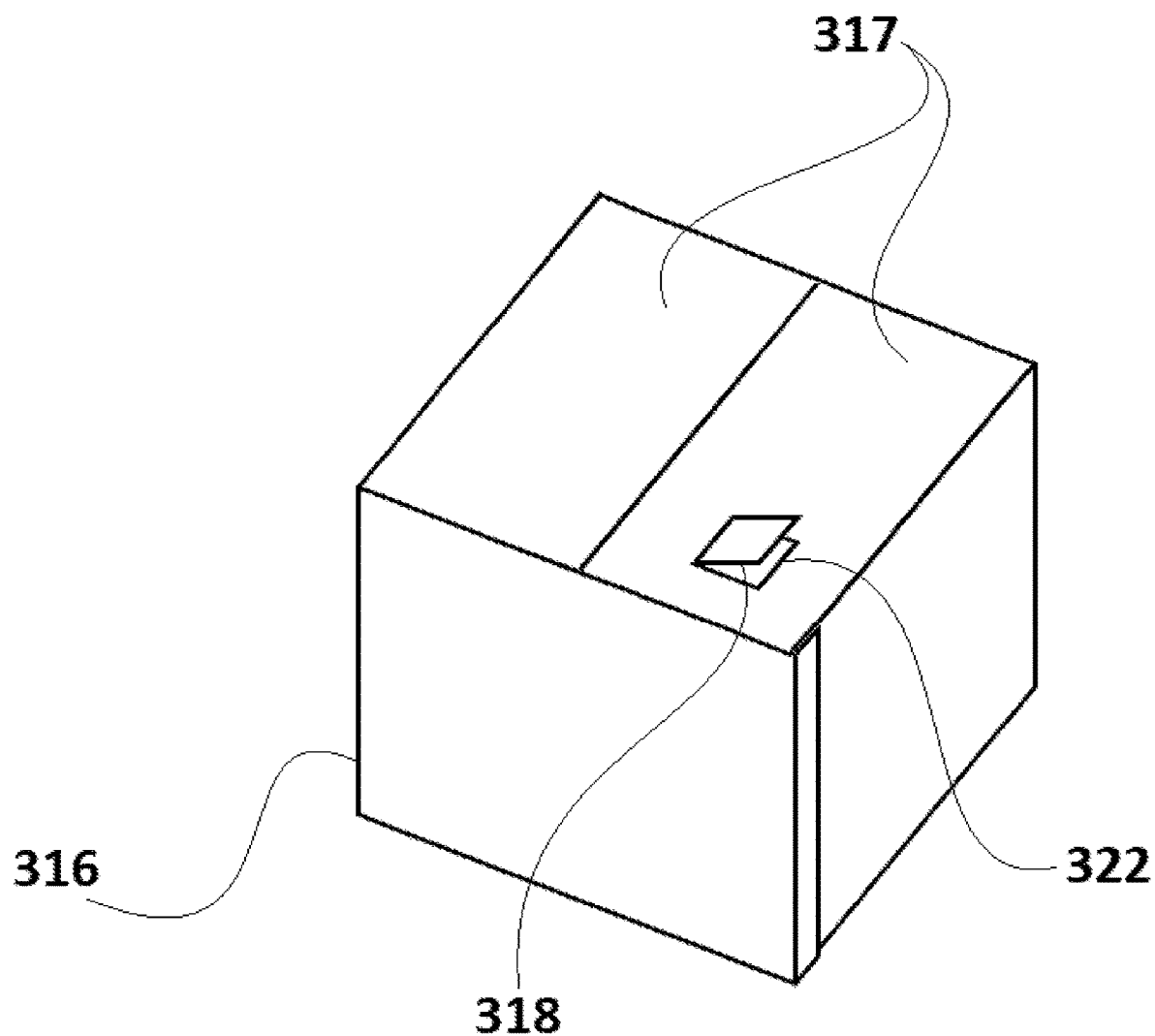
FIG. 9C is a perspective view of the outer box shown in FIG. 9A and FIG. 9B, with the upper flaps fully closed.

FIGS. 9A, 9B and 9C show an outer box 316 for the body 300 and lid 310. Outer box 316 is preferably corrugated cardboard, or substitutes including corrugated plastic sheets, e.g., those manufactured by Coroplast (Quebec, Canada), or wood, metal or another suitable protective material (for protection of the body 300). Of the four upper flaps 317 on outer box 316, one includes a cut-away window 320, which aligns under cut-away window 322, when flaps 317 are closed (FIG. 9C). Cut-away window 322 is preferably covered by a flap 318 cut into the lid 310, such that it can be folded open and closed.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, any of the terms "comprising", "including", containing", etc. are to be read expansively and without limitation. The methods and processes illustratively described herein suitably may be practiced in differing orders of steps, and that they are not necessarily restricted to the orders of steps indicated herein or in the claims. It is also noted that as used herein and in the appended claims, the singular forms "a," "an," and "the" include plural reference, and the plural include singular forms, unless the context clearly dictates otherwise. Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The invention has been described broadly and generically herein. Each of the narrower species and subgeneric groupings falling within the generic disclosure also form part of the invention. The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A smart thermal insulation box comprising:
    an inner insulated box formed of eight panels of expanded polystyrene with mating mitered edges;
    an outer corrugated box having four side corrugated panels joined at one of their edges forming the sides of the outer corrugated box, wherein each said side corrugated panel is contiguous with an upper corrugated panel, such that there are four upper corrugated panels in total, and wherein the outer corrugated box is configured to accommodate the insulated box;
    temperature and humidity sensors positioned inside the insulated box and electrically connected with an externally viewable display panel showing the temperature and humidity detected by the sensors, wherein components associated with operating the display panel reside in a first of the eight expanded polystyrene panels, where said first expanded polystyrene panel faces the upper corrugated panels, and where a first of the upper corrugated panels has a first opening such that when said first corrugated panel is folded towards the inner portion of the outer corrugated box and lies substantially transverse to the side corrugated panels, the opening is positioned over the display panel, and wherein a second of the upper corrugated panels, which is adjacent said first corrugated panel, has a second opening such that when said second corrugated panel is folded towards the inner portion of the outer corrugated box and lies substantially transverse to the side corrugated panels, the second opening is positioned over the first opening, and wherein a substantially flat-bottomed U-shaped flap of corrugated material contiguous with the second corrugated panel is formed by cutting through the second panel in a flat-bottomed U-shape in a position in the second corrugated panel such that said flap, when lying in position towards the second corrugated panel, conceals the second opening, but when pulled away from the second corrugated panel, exposes the second opening and the display panel; and wherein the temperature and humidity sensors are fixed in a recess with mating hook and loop fasteners in a second of the eight expanded polystyrene panels which forms a side of the insulated box, such that no part of said temperature and humidity sensors extends into the insulated box past the plane of the innermost portion of said second of the eight expanded polystyrene panels.

2. The smart thermal insulation box of claim 1 wherein the temperature and humidity sensors reside on a single pad having one portion of s mating hook and loop fastener.

3. The smart thermal insulation box of claim 1 wherein said components include a processor board, a beeper for providing audible alarms and an LCD or LED display screen for displaying the temperature and humidity detected by the sensors.

4. The smart thermal insulation box of claim 3 wherein the processor board includes a microprocessor, having memory and associated circuitry for sensing outputs from the sensors and displaying the temperature and humidity on the display screen.

5. The smart thermal insulation box of claim 4 wherein the microprocessor is capable of recording and averaging temperatures and humidity previously recorded.

6. The smart thermal insulation box of claim 3 further including user input keys to turn on and off or input information to the microprocessor.

7. The smart thermal insulation box of claim 1 further including additional display panels fixed to one or more expanded polystyrene panels.

* * * * *